(12) United States Patent
Remis

(10) Patent No.: US 6,508,200 B1
(45) Date of Patent: Jan. 21, 2003

(54) PET BED WITH HELICAL SPRINGS

(76) Inventor: Steven Remis, 1304 S. Park Rd., Unit 249, Denver, CO (US) 80231-2138

( * ) Notice: Subject to any disclaimer, the term of this patent is extended or adjusted under 35 U.S.C. 154(b) by 0 days.

(21) Appl. No.: 10/005,280

(22) Filed: Dec. 4, 2001

(51) Int. Cl.⁷ .......................... A01K 29/00; A47C 23/04
(52) U.S. Cl. .......................................... 119/28.5; 5/719
(58) Field of Search ................. 119/28.5, 706; 5/229, 248, 719

(56) References Cited

U.S. PATENT DOCUMENTS

| | | | |
|---|---|---|---|
| 2,032,248 A | 2/1936 | Bins | 119/28.5 |
| 2,659,345 A * | 11/1953 | Herbert | 119/28.5 |
| 3,276,048 A * | 10/1966 | Beckman | 5/719 |
| 5,033,408 A | 7/1991 | Langenbahn | 119/28.5 |
| 5,136,981 A * | 8/1992 | Barreto et al. | 119/28.5 |
| 5,144,911 A | 9/1992 | Moore et al. | 119/28.5 |
| 5,265,558 A | 11/1993 | Schonrock | 119/28.5 |
| 5,320,066 A | 6/1994 | Gunter | 119/28.5 |
| 5,588,393 A | 12/1996 | Heilborn | 119/28.5 |
| 5,765,502 A | 6/1998 | Haugh | 119/28.5 |
| 6,347,423 B1 * | 2/2002 | Stumpf | 5/719 |

* cited by examiner

Primary Examiner—Charles T. Jordan
Assistant Examiner—Elizabeth Shaw
(74) Attorney, Agent, or Firm—Ramon L. Pizarro; Edwin H. Crabtree

(57) ABSTRACT

A pet bed that includes an enclosure having a perimeter wall and a floor, and a cushion. The cushion includes a pliable external shell that holds several helical springs, each helical spring being individually covered in a flexible bag. The shell and springs are in turn held within a pliable casing, so that the cushion nests within the perimeter wall, so that the cushion provides variable support to a pet on the cushion by allowing the individually covered springs to flex independently of one another.

10 Claims, 4 Drawing Sheets

PET BED WITH HELICAL SPRINGS

BACKGROUND OF THE INVENTION (a) Field of the Invention

This invention generally relates to a pet bed with internal helical springs. More specifically, but not by way of limitation, to a pet bed with internal individually wrapped helical springs providing support for the animal.

(b) Discussion of Known Art

Many pet owners provide comfortable accommodations such as beds for their pets. Many of the beds for these domesticated animals consist of a fabric outer shell that covers foam, cotton or other fiber, or particulate fill material that supports the animal. A significant disadvantage of these beds is the lack of variable, contour following support that is provided by the fill material.

The use of coil springs to lend support for a seat cushion is known. However, these devices include a rigid, fixed border and support structure that holds the springs in place. These rigid cushions lack the flexibility needed for creating a bed that is suitable for a variety of different animals. Also, the fixed frame, which is typically made from a material such as wood, prevents disassembly of the components for cleaning.

SUMMARY

It has been discovered that the problems left unanswered by known systems are solved by providing a pet bed that includes:
- an enclosure having:
  - a perimeter wall; and
  - a floor attached to the perimeter wall;
- a cushion adapted for nesting between the perimeter wall and the floor, the cushion having an external shell and a plurality of helical springs.

According to one example of the invention the cushion of the bed includes individually wrapped helical springs. The wrapping of each of the springs being a bag that covers the entire spring, such as the types of springs described in U.S. Pat. No. 4,234,984 to Stumpf, incorporated herein in its entirety by reference. It is important to note that while Stumpf describes connected pockets, the individually wrapped coils of this invention do not have to be interconnected.

An important example of the invention taught herein is the use of these individually wrapped coil springs within a flexible cover. The flexible cover holds the springs in the desired relationship relative to one another in order to define the cushion for the pet bed. Of course, it is contemplated that the springs may be held together by a perimeter wire or similar retainer. However, it is also contemplated that the flexible cover may also hold an inner perimeter ring, made of foam or other plastic or synthetic material may be used to help keep the springs in a desired relationship relative to one another.

Importantly, the separate inner cushion retains the springs in a desired configuration. The insertion of the cushion into the enclosure, allows the perimeter wall and the floor of the enclosure to reinforce and retain the shape of the inner cushion. Also, the separate inner cushion allows the use of sheets and similar components to allow the user to provide greater comfort to the pet. Still further, it is contemplated that the entire assembly may be supported on a pedestal that keeps the enclosure, and hence the entire pet bed, above the floor or ground.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

Figure 8:
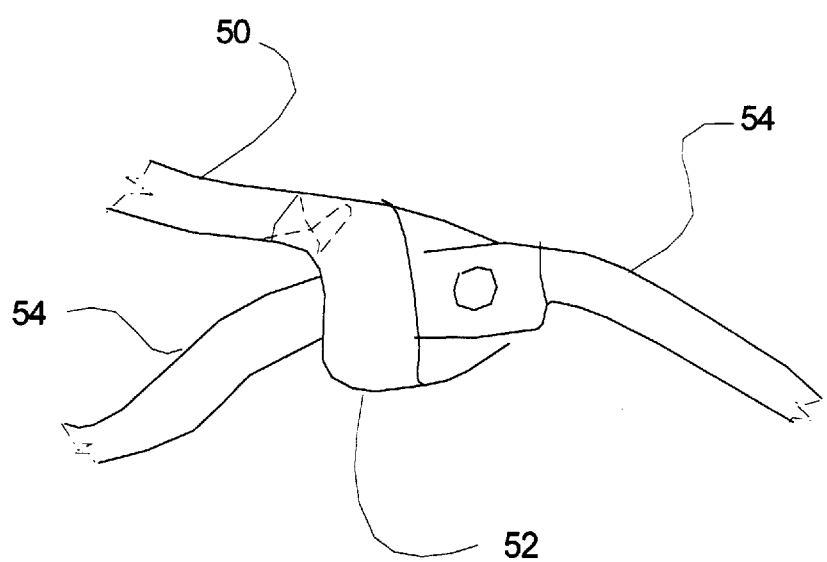

FIG. 8 further illustrates the seat belt attachment.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Turning now to FIGS. 1, 2, 3 and 4, where a pet bed 12 that includes an enclosure 11 that supports a cushion 10. The enclosure 11 is similar to well known pet bed arrangements in that it has a perimeter wall 30 and a floor 34 attached to the perimeter wall. A cushion 10 adapted for nesting between the perimeter wall 30 and the floor 34 has been shown mounted within the enclosure 11. Many known versions of pet beds are made with a generally oval perimeter wall 30. However, the cushion used with these pet beds is simply a synthetic foam pad. As illustrated in the enclosed drawings, and particularly in FIGS. 2 through 4, the disclosed invention illustrate the individually wrapped coil springs 14 that are used to add support within the cushion 10.

Figure 2:
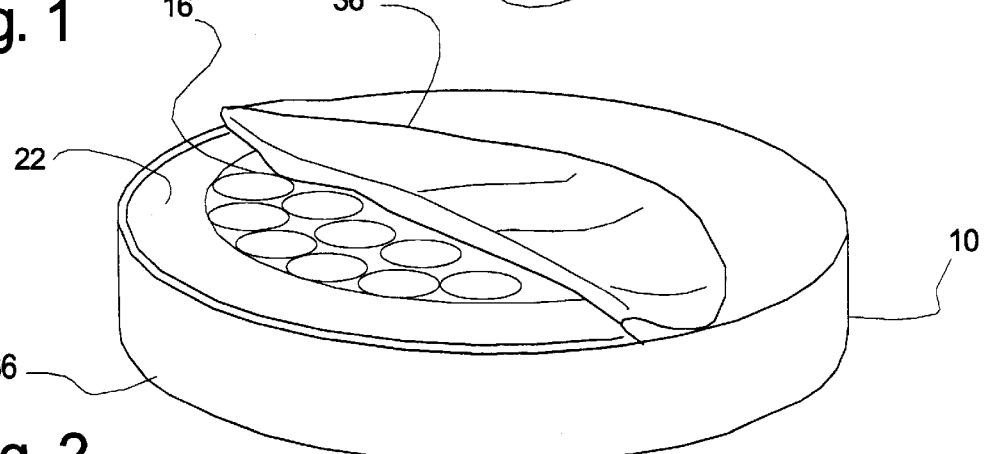
FIG. 2 illustrates the cushion shown on FIG. 1. The cushion being shown while opened to show the arrangement of the individually wrapped coil springs and a foam perimeter.

As illustrated in FIG. 2, it is contemplated that the cushion 10 will be formed by using a soft, or pliable, outer cover 16. It is contemplated that the cover may be made of a fabric type material that will allow the cushion 10 to be manufactured through sewing.

Also shown on FIG. 2, is that it is contemplated that the cushion 10 will include an external shell 36 that holds and conceals a plurality of helical springs 16 that are individually wrapped in a pliable bag 18. The external shell 36 defines a flexible cover that holds the springs 16 in the desired relationship relative to one another in order to define the cushion 10 for the pet bed. Of course, it is contemplated that the springs may be held together by a perimeter wire or similar retainer (not shown). However, it is also contemplated that the flexible cover may also hold an inner perimeter ring 14, made of foam or other plastic or synthetic material may be used to help keep the springs in a desired relationship relative to one another.

Figure 4:
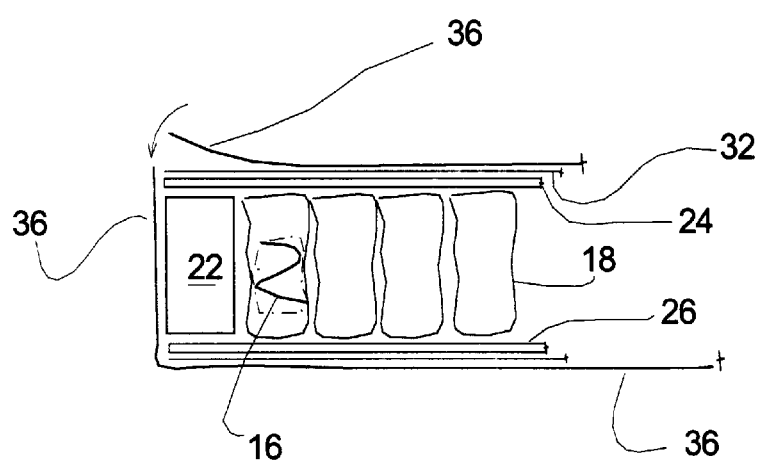
FIG. 4 is a cross-section of the mattress, and showing the internal components and individually wrapped coil springs.

Also illustrated in FIGS. 2 and 4 is that it is contemplated that the pliable external shell 36 can be formed from a foam ring 22, that creates a perimeter wall for the cushion, a foam top cover 24 and a foam bottom cover 26. The area or space between the foam ring 22, the foam top cover 24 and the foam bottom cover 26 is filled with a plurality of springs, and in the illustrated example, a plurality of helical springs 16 that are individually wrapped within a pliable bag 18. Thus, the separate inner cushion 10 assembly retains the springs 16 in a desired configuration. The insertion of the cushion into the enclosure allowing the perimeter wall 30 and the floor 34 of the enclosure 11 to reinforce and retain the shape of the inner cushion 10.

Figure 3:
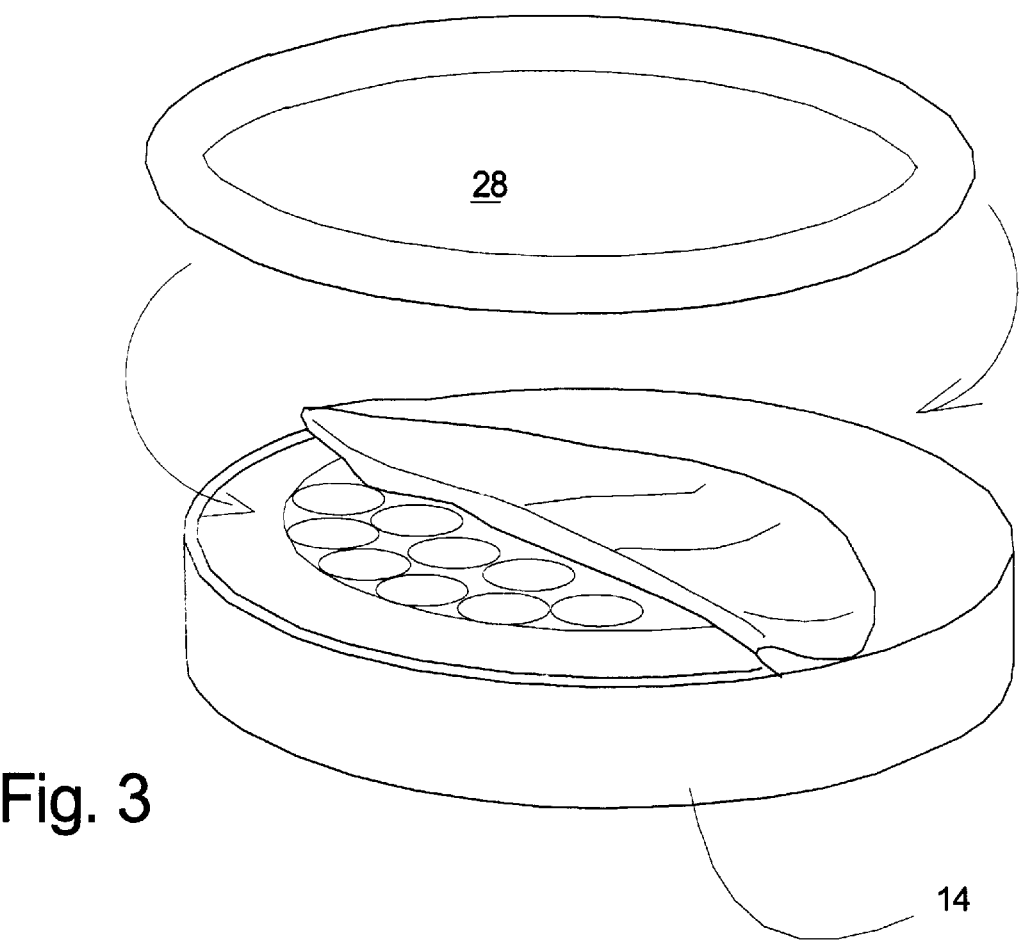
FIG. 3 illustrates the use of a cover pad, which may be used inside the cove or over the assembled pet bed.

Turning to FIG. 3, it will be understood that the separate inner cushion 10 allows the use of sheets and similar components to allow the user to provide greater comfort to the pet. Additionally, as illustrated, it is contemplated that a separate pad 28 can be used with the pet bed 12. Pad may be made from wool pile, shag material, batting, or other suitable padding material, and may even include an impermeable layer that protects the cushion 14 from waste materials. The pad 28 may be used within the external shell 36 or over the cushion 10.

FIG. 3 also shows that it is contemplated that an impermeable sheet 32 may be used over the foam top cover 24 to prevent seepage of waste fluids into the cushion 10. It is contemplated that the external shell 36 will be made of a washable material to allow machine washing of the external shell 36. Still further, it is contemplated that the entire assembly of the pet bed 12 may be supported on a pedestal or stand 38 that keeps the entire pet bed, above the floor or ground. The stand 38 has been illustrated in FIGS. 1, 5, and 6, and may include an attachment mechanism such as hook and loop material, snap fasteners, or belts to hold the pet bed 12 over the stand 38. As shown in these illustrations, it is contemplated that the stand being adapted for supporting the pet bed at a distance from a floor surface. Additionally, comprises at least one concealable food support tray 40 that includes an area adapted for engaging a dished bowl 42 or other device for supporting foodstuff for the pet.

Figure 1:
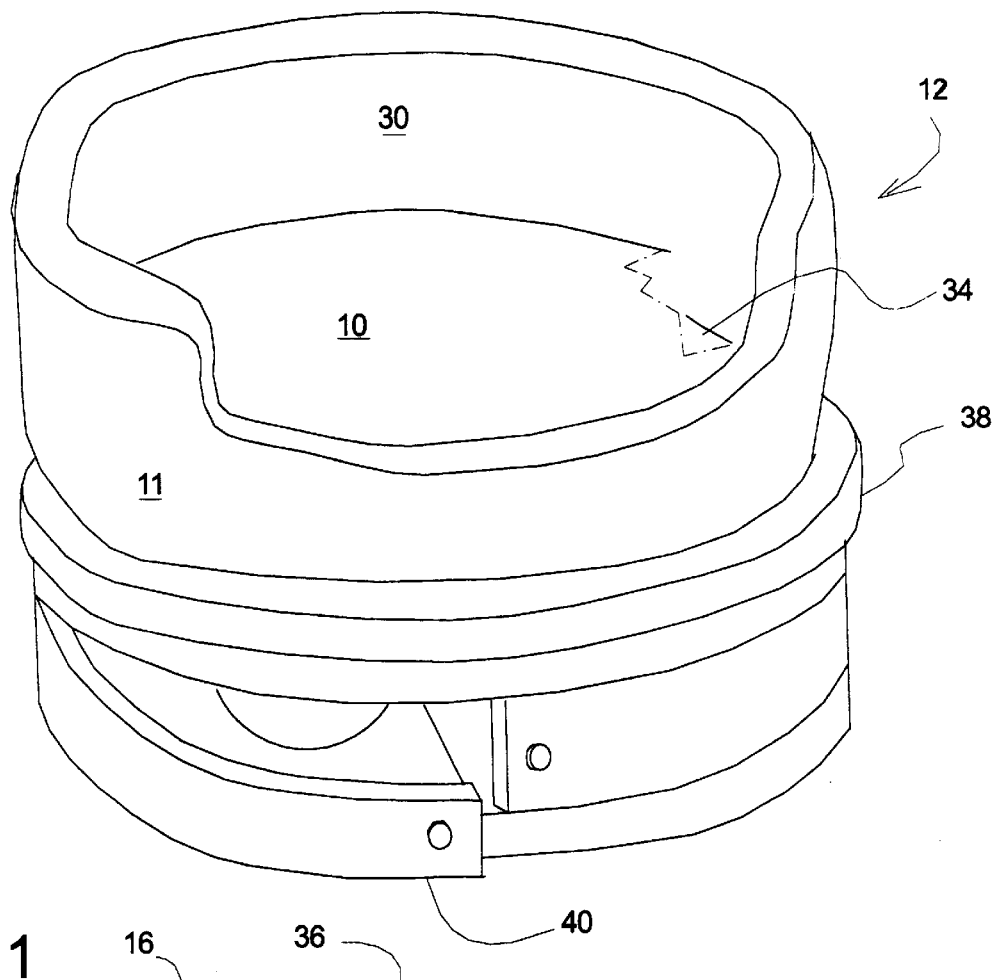
FIG. 1 is a perspective view of an embodiment of the invention.
Figure 5:
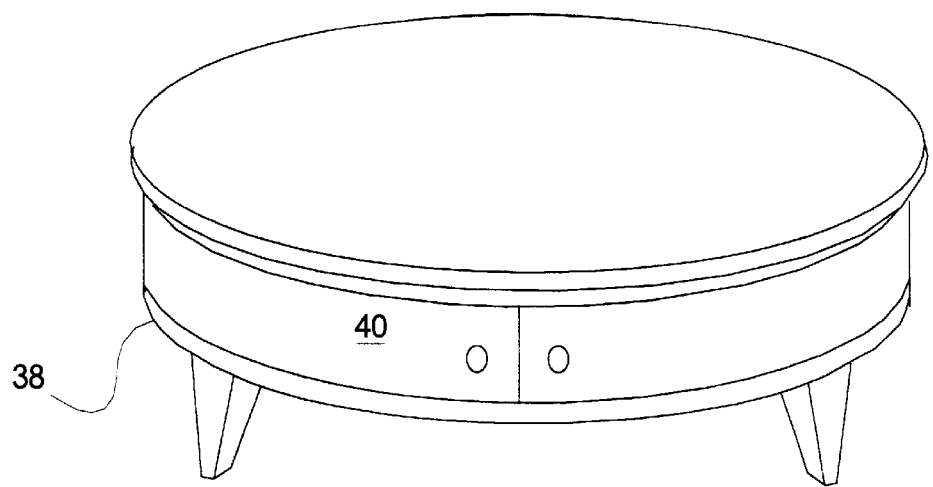
FIG. 5 is a plan view of the pedestal or stand used with the invention.
Figure 6:
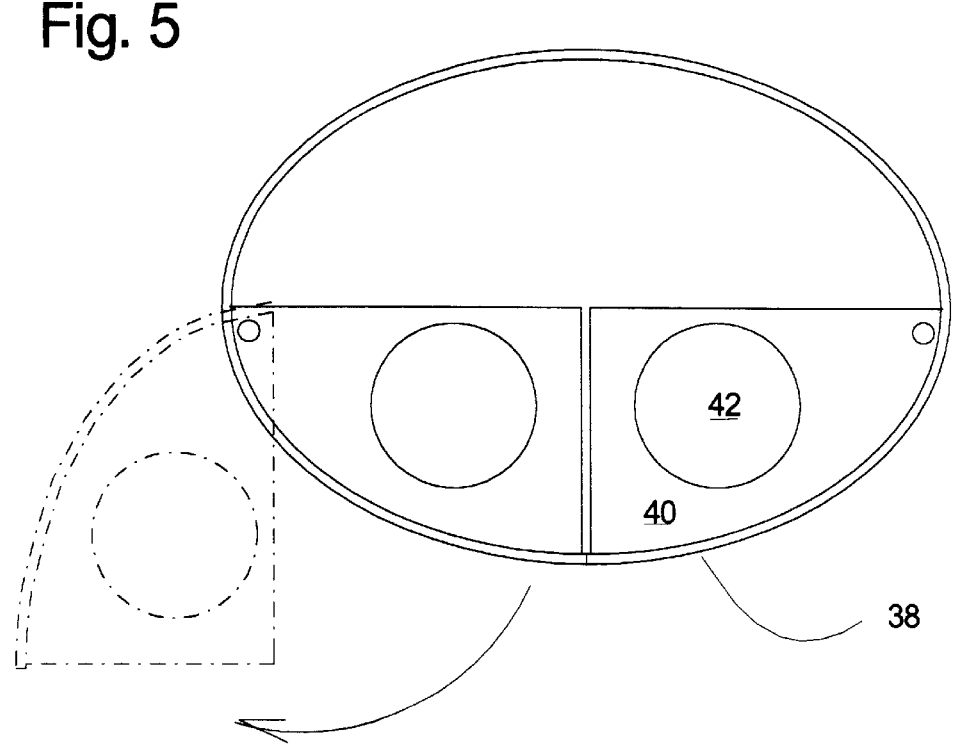
FIG. 6 illustrates the opening of bowl support drawers used with the invention. The top of the stand has been omitted from the drawing to show the internal arrangement.

As shown in FIGS. 1, 5 and 6, it is contemplated that the concealable food support trays 40 will be pivotally mounted from the stand 38. However, it is also contemplated that sliding drawers or platforms may also be used.

Figure 7:
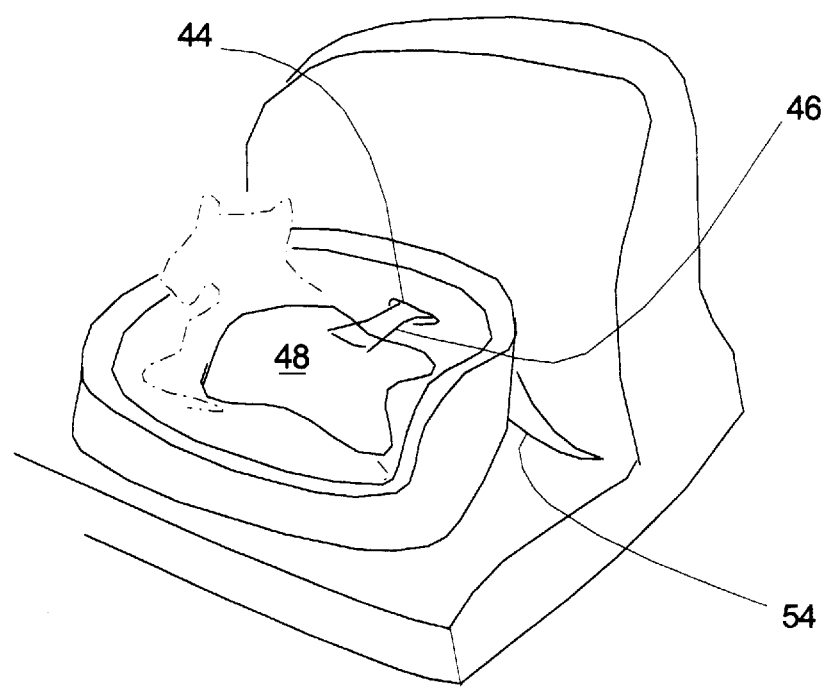
FIG. 7 illustrates a seat-belt attachment for use with the disclosed invention. The seat belt attachment aiding in restraining the dog or similar pet in the event of an accident.

Turning to FIGS. 7 and 8, it will be understood that the disclosed pet bed 12 may include a passage way 44 that has been adapted for supporting a safety restraint belt 46 from the pet bed 12. The safety restraint belt 46 is attached to a harness 48, which may be in the form of a vest or similar jacket-like device, which is used over the torso of the pet. The restraint belt 46 is in-turn attached to the vehicle's seat belts 54 by way of a strap 50 and a loop 52 that extends around the seat belts 54. Additionally, it is contemplated that the strap 50 may simply attach to the vehicle's seat belts 54 by simply including a buckle component that cooperates with the seat belt buckle 56. In other words, the end of the strap 50 would include a seat belt buckle connector similar to the connector found on one of the mating ends of the seat belt buckle.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A pet bed comprising:
   an enclosure having a perimeter wall and a floor; and
   a cushion, the cushion comprising:
      a pliable external shell;
      a plurality of helical springs, each helical spring being individually covered in a flexible bag, the plurality of helical springs being held within the pliable external shell; and
      a pliable casing, the pliable casing covering the pliable external shell, the cushion being adapted for nesting within the perimeter wall, so that the cushion provides variable support to a pet on the cushion by allowing the individually covered springs to flex independently of one another.

2. A pet bed according to claim 1 wherein said pliable external shell comprises a foam ring and a foam top cover and a foam bottom cover.

3. A pet bed according to claim 2 and further comprising an impermeable sheet, the impermeable sheet being positioned between foam top cover and the pliable casing.

4. A pet bed according to claim 1 and further comprising at least one passage way adapted for supporting a safety restraint belt from the pet bed.

5. A pet bed according to claim 1 and further comprising a stand, the stand being adapted for supporting the pet bed at a distance from a floor surface.

6. A pet bed according to claim 5 wherein said stand further comprises at least one concealable food support tray.

7. A pet bed according to claim 6 wherein said concealable food support tray comprises a support platform having an area adapted for engaging a dished bowl.

8. A pet bed comprising:
   a support stand,
   an enclosure having a perimeter wall and a floor, the enclosure being adapted for mounting over the support stand; and
   a cushion, the cushion comprising:
      a pliable external shell;
      a plurality of helical springs, each helical spring being individually covered in a flexible bag, the plurality of helical springs being held within the pliable external shell; and
      a pliable casing, the pliable casing covering the pliable external shell, the cushion being adapted for nesting within the perimeter wall, so that the cushion provides variable support to a pet on the cushion by allowing the individually covered springs to flex independently of one another.

9. A pet bed according to claim 8 wherein said support stand comprises at least one concealable support for a dished food bowl.

10. A method for making a pet bed, the method comprising:

provoiding an enclosure having a perimeter wall and a floor; and providing a cushion, the cushion formed by:

forming a pliable external shell by forming a foam ring having a foam top and a foam bottom;

filling the pliable external shell with a plurality of helical springs, each helical spring being individually covered in a flexible bag, the plurality of helical springs being held within the pliable external shell; and covering the pliable external shell with a pliable casing, the pliable casing covering the pliable external shell, the cushion being adapted for nesting within the perimeter wall, so that the cushion provides variable support to a pet on the cushion by allowing the individually covered springs to flex independently of one another.

* * * * *